Patented June 22, 1926.

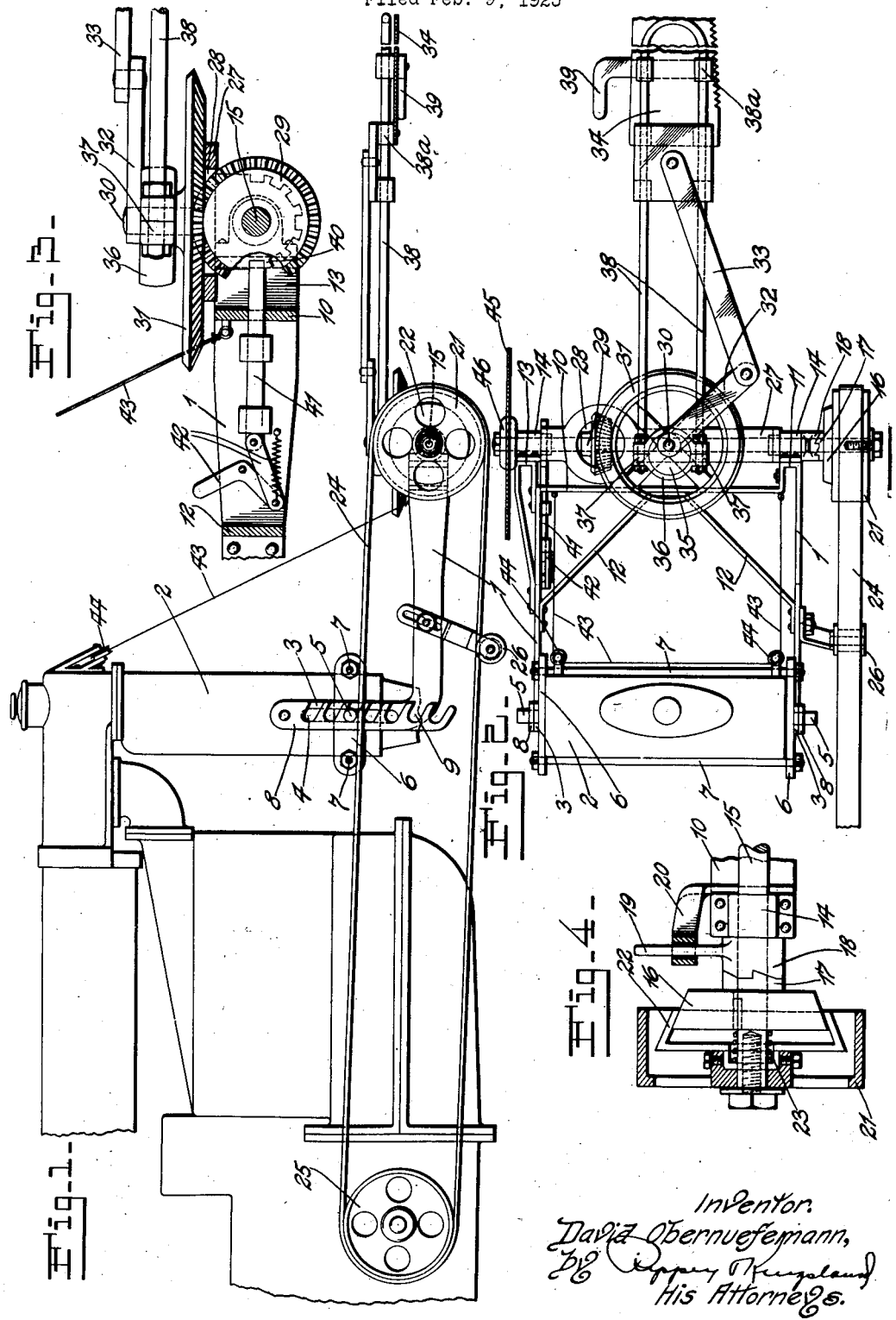

1,589,481

UNITED STATES PATENT OFFICE.

DAVID OBERNUEFEMANN, OF O'FALLON, ILLINOIS.

TRACTOR-DRIVEN MACHINERY.

Application filed February 9, 1925. Serial No. 7,754.

This invention relates to tractor driven machinery, and has special reference to mechanism designed and adapted to be connected with and operated by the usual farm tractor.

An object of the invention is to provide means for connecting a mechanism to a tractor and for operating the mechanism by the power of the tractor while the tractor stands in a stationary position with the engine running.

Another object of the invention is to provide wood working mechanism of a generic nature, in combination with means for connecting the same to a tractor to operate the wood working mechanism in different directions while the tractor stands in a stationary position with the engine running.

Another object of the invention is to provide supporting and operating mechanism for wood saws, means for supporting said mechanism in connection with a tractor and for operating the mechanism by the power of the tractor engine while the tractor stands in a stationary position, and means for operating a saw or saws by said mechanism in different angles of inclination.

Various other objects of the invention will be apparent from the following description, reference being made to the accompanying drawing, in which—

Fig. 1 is a side elevation of the invention in connection with a tractor.

Fig. 2 is a plan view.

Fig. 3 is a detail view showing means for supporting a saw for operation in different planes or angles of inclination.

Fig. 4 is a sectional view of a clutch device constituting a part of the driving mechanism.

The invention comprises a supporting frame including a pair of side arms 1 the rear ends of which embrace the tractor radiator 2 between them. The rear end of each arm 1 is formed with an upward extension 3 having a longitudinal slot 4 therein receiving the ends of studs 5 extending laterally from plates 6 supportingly clamped against the sides of the radiator by rods 7. Provision is made for supporting the frame comprising the arms 1 in different vertical adjustments, the same comprising notched plates 8 having their upper ends pivotally connected with the upper ends of the extensions 3 and designed and adapted to receive the studs 5 in the respective notches 9. The front ends of the arms 1 are united by a cross connection 10 which may be integral with said arms, as shown, and shaped to provide at one side a forwardly extending bearing supporting portion 11. Additional rigidity of the frame may be obtained by braces 12 having their front ends connected with the cross section 10 and their rear ends to the arms 1. An additional bearing supporting portion 13, corresponding to the bearing support 11, is in connection with the opposite side of the frame.

Bearings 14 are attached to the bearing supports 11 and 13 and a shaft 15 is journaled in said bearings. A cone clutch member 16 is keyed to slide on and rotate the shaft 15. A cam element 17 is loose on the shaft 15 against the inner end of the hub of the member 16 and is adapted to be engaged by another cam member 18 which is loose on the shaft 15 for sliding movements thereon. A lever 19 extends from the cam member 18 for turning the same on the shaft 15 to force the cam 17 outwardly, thereby disengaging the clutch member 16 from the member 22. A pulley 21 is mounted loosely upon the shaft 15 and is in connection with a cone clutch member 22 arranged to engage the clutch member 16. A spring 23 encircles the shaft 15 and actuates the pulley and the clutch member 22 in a direction to cause said clutch member 22 to engage the clutch member 16. This clutch device provides means for driving the shaft 15 from power transmitted to the pulley 21 by a belt 24 operated by the usual tractor belt pulley 25 which may be operated by the running engine of the tractor while the tractor remains stationary, as is well known. An adjustable idler pulley 26 may be provided in connection with the frame 1 to maintain the belt properly operative. The clutch device shown will yield should the driven tool become rigid or caught in the work so firmly that yielding of the clutch is desired. This avoids danger of breaking the tool.

An approximately U-shaped frame member or support 27 has its ends supported for turning movements upon the inner ends of the bearings 14 and may be turned to different positions about the shaft 15 as an axis. An opening 28 is provided near one end of the support 27 through which a beveled pinion 29 on the shaft 15 extends. The frame 27 supports an actuator for a tool which actuator comprises a stud 30 upon which a relatively large beveled gear wheel 31 is rotative, the same meshing with the beveled pinion 29; and an arm 32 which is attached to the hub of the gear wheel 31 and is connected by a link 33 with a saw 34 or other working mechanism or tool to impart reciprocating movements thereto. An eccentric 35 is also attached to the hub of the gear wheel 31 and the strap 36 of said eccentric is provided with diametrically opposite portions 37 to which the rear ends of a rod or rods 38 are attached. The rods 38 have sliding connection 38ª with the tool 34 and assist in holding the saw or tool 34 in the proper plane while the eccentric device imparts an edgewise oscillating motion to the saw or tool as an incident to the longitudinal operation of the saw or tool by the connection 33. A handle 39 in connection with the saw or tool may be provided for manual engagement by the operator to aid in pressing the saw or tool against the work and holding it in the proper plane.

As stated, the supporting bar or frame 27 is rotative upon the bearings 14 about the shaft 15 as an axis. One end of said bar or frame is provided with a number of teeth 40 adapted to be engaged by a latching detent 41 supported by the adjacent arm 1, whereby the gear wheel 31 and operating connections driven thereby may be supported in different desired planes or angles of inclination with respect to the shaft 15. Releasing and engaging connections 42 are provided for the latching detent 41.

From the foregoing it will be seen that the saw may be operated in any plane or angle of inclination desired to cut horizontally, obliquely or vertically, the adjustment of the saw for such operations being obtained by adjusting the frame 27 to support the gear wheel 31 in the desired angle or plane. Further the saw may be operated to cut in either direction.

The operating or driving mechanism carried by the frame 1 may be supported at different heights by a rope or chain 43 passing over pulleys 44 attached to the front end of the tractor, the lower ends of the rope or chain 43 being connected to the arms 1. By shortening or lengthening the rope or chain 43 the height at which the frame will be supported may be varied as desired.

In addition to the cross cut or reciprocating type of saw or tool the invention provides for the use and operation of a circular saw 45 which may be releasably attached to one end of the shaft 15 by a clamping device 46 which permits mounting and removal of the saw 45.

When it is desired to move the tractor to transport the machinery from place to place the saw 34 may be raised to an inclined position against the front end of the radiator and held in such position by the latch structure 40—41.

From the foregoing it will be seen that my invention comprises improved mechanism operated by a tractor for cutting down trees or for sawing the trees after they have been cut into lengths or other fabricated shapes. The form of the mechanism may be varied widely and within equivalent limits without departure from the nature and principle of the invention. I do not restrict myself in any unessential respects, but—

What I claim and desire to secure by Letters Patent is:—

1. Machinery of the character described comprising a supporting frame, means for supporting said frame upon a tractor, driving mechanism supported by said frame, a working tool, means for imparting longitudinal reciprocating movements to said tool by said driving mechanism in different angles of lateral and longitudinal inclination of said tool, and means for operating said driving mechanism by the power of said tractor when the tractor stands in a stationary position.

2. Mechanism of the character described comprising a frame, a shaft supported by said frame, a support arranged to swing about said shaft as an axis, a gear wheel supported by said support, a pinion attached to said shaft engaging said gear wheel, means for holding said support in position to retain said gear wheel in different planes and angles of inclination while in engagement with said pinion, a tool to be operated, and devices operated by said gear wheel for imparting longitudinal and lateral movements to said tool.

3. Mechanism of the character described comprising a rotary shaft, means for rotating said shaft, a frame mounted to swing about said shaft as an axis, a gear wheel supported by said frame, means for rotating said gear wheel from said frame in any position of said frame about the axis of said shaft, and means for imparting longitudinal movements to a tool by said gear wheel.

4. Mechanism of the character described comprising a rotary shaft, means for rotating said shaft, a frame mounted to swing about said shaft as an axis, a gear wheel supported by said frame, means for rotating said gear wheel from said frame in any position of said frame about the axis of said shaft, and means for imparting lateral oscillating movements to a tool by said gear wheel.

5. Mechanism of the character described comprising a rotary shaft, means for rotating said shaft, a frame mounted to swing about said shaft as an axis, a gear wheel supported by said frame, means for rotating said gear wheel from said frame in any position of said frame about the axis of said shaft, and means for imparting longitudinal and lateral oscillating movements to a tool by said gear wheel.

6. Mechanism of the character described comprising a frame, means for supporting said frame at different heights, and at different angles of inclination, a rotary shaft supported by said frame, means for rotating said shaft in any of said positions of said frame, a support movable about said shaft as an axis, means for holding said support in different adjusted positions about said shaft as an axis, an actuator carried by said support, means for operating said actuator from said shaft in any of said positions of said support and said actuator about said shaft as an axis, and connections for operating a tool by said actuator.

7. Mechanism of the character described comprising a frame, means for supporting said frame at different heights and at different angles of inclination, a rotary shaft supported by said frame, means for rotating said shaft in any of said positions of said frame, a support movable about said shaft as an axis, means for holding said support in different adjusted positions about said shaft as an axis, an actuator carried by said support, means for operating said actuator from said shaft in any of said positions of said support and said actuator about said shaft as an axis, and connections for imparting reciprocating and lateral oscillating movements to a tool by said actuator.

8. Mechanism of the character described comprising a frame, a shaft journaled in said frame, means for rotating said shaft, an actuator supported by adjustment about said shaft as an axis, means for operating said actuator from said shaft in any of the positions of said actuator with respect to the axis of said shaft, a tool pivotally connected with said actuator for movement to different radial positions relative to said actuator, and connections for imparting reciprocating movements to said tool by said actuator.

9. Mechanism of the character described comprising a gear wheel, mechanism for rotating said gear wheel, an eccentric operated by said gear wheel, an arm rotated by said gear wheel, a tool, connections from said tool to said eccentric, and a connection from said tool to said arm.

10. Mechanism of the character described comprising a gear wheel, means for supporting said gear wheel in different planes and angles of inclination, mechanism for rotating said gear wheel in any of its supported positions, an eccentric operated by said gear wheel, an arm rotated by said gear wheel, and a tool connected with said eccentric and with said arm for operation thereby.

11. Mechanism of the character described comprising a frame, a shaft rotative in said frame, a support movable about said shaft as an axis, means for holding said support in different adjusted positions with respect to said shaft as an axis, a gear wheel carried by said support and arranged to be supported thereby in different planes in different angles of inclination, means for rotating said gear wheel from said shaft in any of said positions, an eccentric operated by said gear wheel, a tool connected with said eccentric and oscillated thereby, and means for imparting reciprocating movements to said tool by said gear wheel.

12. Mechanism of the character described comprising a frame, means for supporting one end of said frame, means for supporting the opposite end of said frame at different heights with respect to the first named end, a shaft supported by the second end of said frame, power connections for rotating said shaft, an actuator, means for supporting said actuator in different planes and angles of inclination about said shaft as an axis, and means for operating a tool by said actuator.

13. The combination with a tractor and a belt pulley operated thereby, of a frame detachably supported by said tractor, an actuator supported by said frame, means for operating said actuator from said belt pulley, and means for imparting reciprocating and oscillating movements to a tool from said actuator.

DAVID OBERNUEFEMANN.